Nov. 17, 1936.  L. W. EGGLESTON  2,061,537
REGULATOR FOR HEATING APPARATUS
Original Filed March 11, 1933  3 Sheets-Sheet 1

INVENTOR
Lewis W. Eggleston
BY
his ATTORNEY

Nov. 17, 1936.   L. W. EGGLESTON   2,061,537
REGULATOR FOR HEATING APPARATUS
Original Filed March 11, 1933   3 Sheets-Sheet 3

Patented Nov. 17, 1936

2,061,537

UNITED STATES PATENT OFFICE 2,061,537

REGULATOR FOR HEATING APPARATUS

Lewis W. Eggleston, Detroit, Mich., assignor to Detroit Lubricator Company, Detroit, Mich., a corporation of Michigan Application March 11, 1933, Serial No. 660,345
Renewed April 21, 1934

26 Claims. (Cl. 236—9)

My invention relates broadly and generally to new and useful improvements in regulators for heating apparatus, and more particularly of the type adapted to control combustion of fuel in a house heating boiler or furnace in order to produce a desired heat output, or to maintain controlled combustion conditions.

The primary object of the invention is to provide improved means for the purpose mentioned, which will be simple in construction, efficient in operation, and which will function to control the operation of the heating apparatus to produce or maintain a desired temperature in a room or other space supplied with heat by the heating apparatus.

In the embodiment shown by way of exemplification, the invention is disclosed as applied to a damper operating means for the usual check damper and draft damper of a house heating apparatus, which means is constructed to operate the dampers under certain conditions existing in accordance with a characteristic of the combustion, or an effect of the combustion, of the heating apparatus, and also according to the temperature existing in a room or other space to which the heat is delivered. In the embodiment illustrated, is provided a regulator responsive to variations in a condition attending combustion, for example, temperature or pressure, to maintain certain combustion conditions whenever the temperature of the space heated falls below a given degree, so that the heating apparatus is under control of conditions existing at the apparatus, and also includes provisions whereby when the temperature in the space heated rises above a certain degree, the regulator will be operated to cause the dampers to reduce the rate of combustion independently of the means which is responsive to the heat condition existing at the apparatus.

In the embodiment shown, is provided a damper lever connected to the check and draft dampers of a heating apparatus, which lever is normally under control of a temperature or pressure responsive means subject to internal conditions in the heating apparatus to open the check damper and close the draft damper when the temperature effect is high, and to open the draft damper and close the check damper when the temperature effect is low, and thus maintain combustion conditions at a point to produce a desired heat output necessary to properly heat a room or other space. Associated with said lever is a motor element consisting of a thermostat which is electrically heated by a heating element in electric circuit with a thermostatically operated switch located in the space to be heated, which switch preferably operates upon a drop in temperature to close the circuit to the motor, and upon a rise in temperature above a fixed point to open the circuit to the motor. The arrangement is such that when the temperature in the room is below a desired degree, the circuit will be closed to cause the motor to permit the damper lever to function to control the dampers under the influence of the temperature condition at the heating apparatus, but upon a rise in temperature in the space heated, the circuit will be broken to cause the motor to act on the damper lever to close the draft damper and open the check damper to thereby reduce the rate of combustion and the heat output to the space supplied with heat.

The invention consists in the improved construction and combination of parts, to be more fully described hereinafter, and the novelty of which will be particularly pointed out and distinctly claimed.

In the accompanying drawings I have shown a preferred embodiment of my invention, and wherein—

Figure 1:
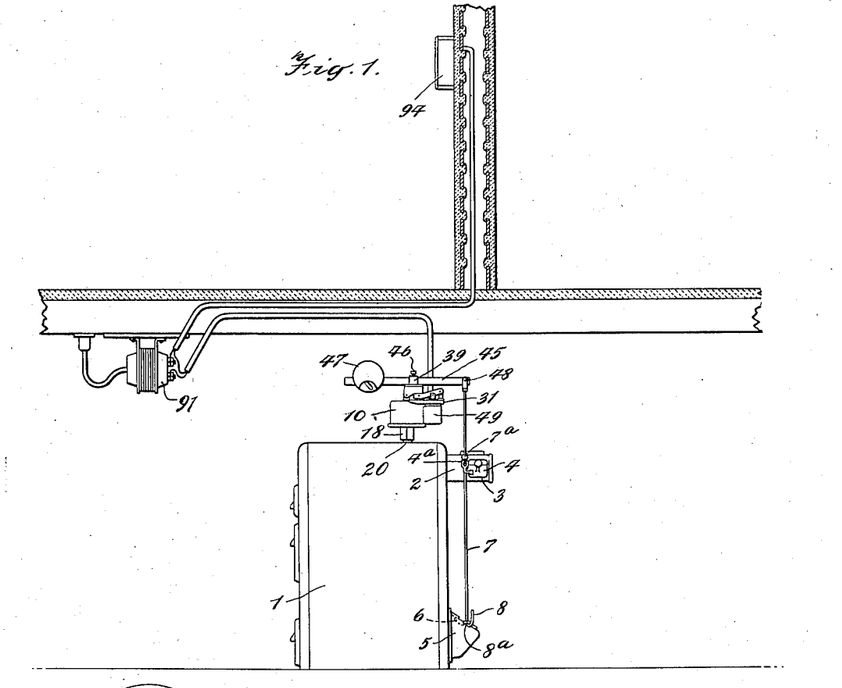
Figure 1 is a view in side elevation of a heating apparatus such as a boiler, showing regulating means constituting my invention applied thereto.
Figures 5, 7, 8:
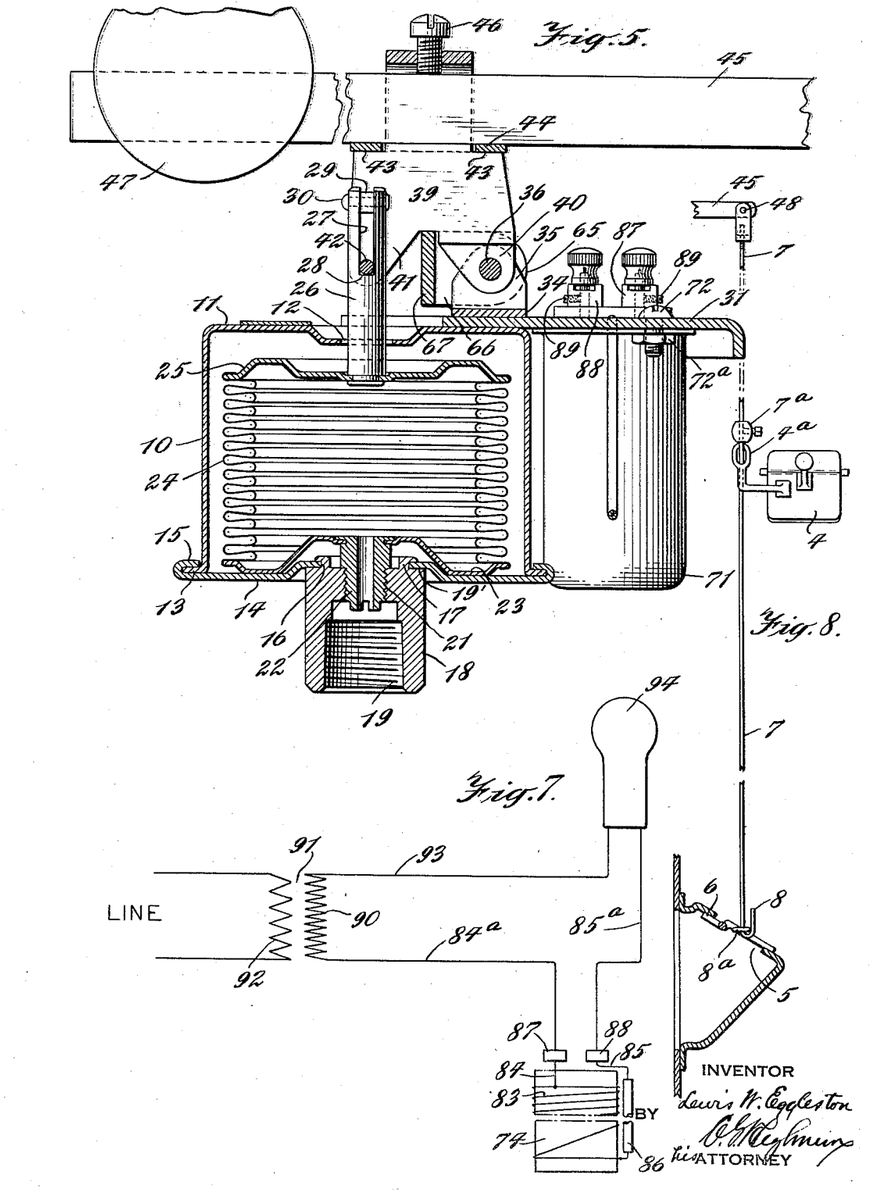
Fig. 5 is a sectional view on the line 5—5 of Fig. 3.
Fig. 7 is a diagram of an electric circuit for controlling the electric current to the electrically heated thermostatic means shown in Fig. 6.
Fig. 8 is a detail view of one form of damper control mechanism in connection with which my regulating means is adapted to be used.

Referring to the drawings by characters of reference, I designates generally a house heating apparatus, in the present instance a boiler for generating steam for a steam heating system, or hot water for a hot water heating system. As the invention is not limited to the particular type of heating apparatus and is applicable to many different types and constructions, it is not necessary to illustrate or describe such apparatus in detail, or to disclose the manner in which it supplies steam or hot water to a heating system, as these systems are well known in the art. The heating apparatus is provided with an outlet flue 2 for products of combustion from the heating apparatus, and is adapted to be connected to a stack, not shown. This outlet flue is provided with an opening 3 to the atmosphere, controlled by a suitably pivoted check damper 4, which when opened admits air through the opening 3 to the stack to check combustion in the apparatus, all in a well known manner. The heating apparatus is also provided at the base thereof beneath the grate (not shown) with an air inlet 5 controlled by a pivoted draft damper 6. Both dampers may be of a well known type adapted to close by gravity, and are operated to open position by a connecting rod 7 connected to the draft damper by means of a lost motion loop 8 on the lower end of the rod engaging an eye 8a on said damper. The rod passes slidably through an eye 4a on the check damper 4, and on the rod above said eye 4a is a stop button 7a adjustably fixed on said rod and adapted upon descent of the rod to strike the eye 4a to swing the damper 4 to open position. The arrangement is such that upon descent of the rod, the draft damper 6 will be permitted to close by gravity, and the button 7a will then engage the eye 4a to open the check damper, and upon rising of the rod the button will release the check damper, permitting it to move toward closed position, and then loop 8 will positively engage eye 8a to open the draft damper.

The damper control just described being of a well known construction well understood in the art, it is not believed necessary to describe the same in greater detail.

Figure 2:
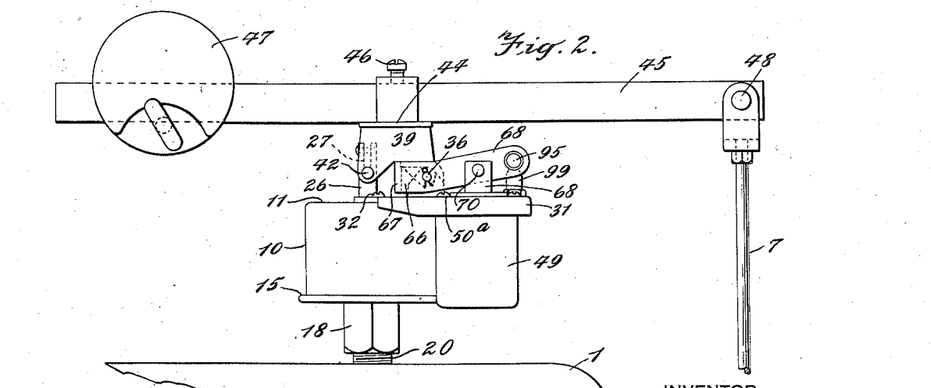
Fig. 2 is an enlarged view in side elevation of the regulating means.
Figure 4:
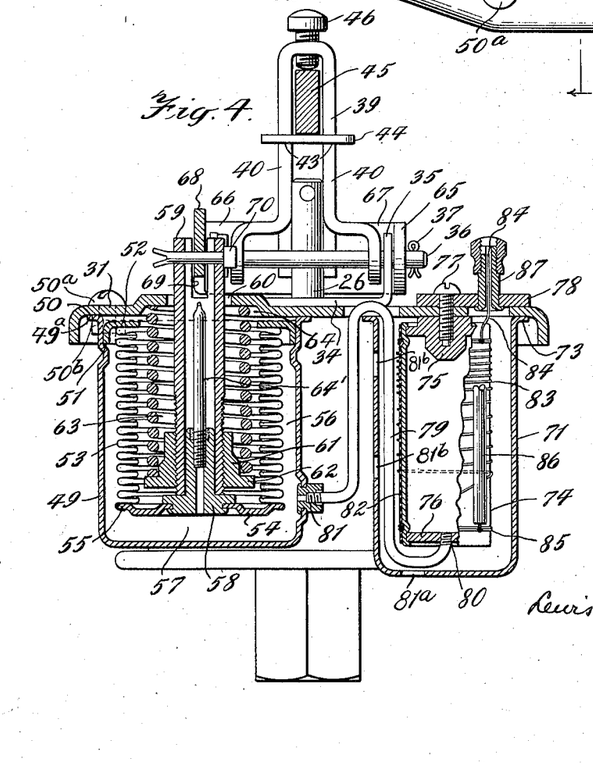
Fig. 4 is a vertical section on the line 4—4 of Fig. 3.

On the heating apparatus is arranged a regulating means which responds to a temperature condition produced by the heating apparatus to control the dampers 4 and 6, this means in the case of a steam boiler being responsive to pressure of the steam in the boiler, and in the case of a water heating boiler being responsive to the temperature of the body of water heated by the boiler, and acting in response to the pressure or temperature to regulate the position of said dampers. In the embodiment illustrated, the said means is responsive to steam pressure and comprises a cylindrical enclosing chamber 10, having an upper head 11, preferably integral therewith and provided with a central opening 12, and at its lower edge portion is provided with an outwardly directed flange 13 to which is secured a lower head 14 by means of a turned-over flange 15 which is rolled down onto the flange 13 to provide a fluid-tight joint between the lower head and the chamber 10. The lower head 14 is formed with a central opening 16 to receive an annular flange 17 on a tubular coupling or fitting 18 which is interiorly threaded at 19 to receive a threaded and tubular coupling piece 20 adapted to be threaded into the wall of the boiler so as to communicate with the steam space thereof. The coupling piece 18 is connected to the head 14 by rolling over the end of the flange 17 onto the inner face of the head, so that the latter will be clamped and sealed fluid-tight against an annular shoulder 19' on the upper end of the coupling piece. The coupling piece 18 is formed with a central, interiorly threaded opening 21, into which is threaded a tubular nipple 22, the inner end of which supports and has sealed thereto the lower head 23 of a cylindrical, expansible-collapsible element in the form of a metallic bellows 24, the upper end of which is closed by a rigid head 25. The arrangement is such that the element 24 is closed by the heads 23, 25 to form a sealed chamber communicating with the steam space of the boiler through the nipple 22 and coupling 18, whereby the element 24 will be expanded by pressure of steam reacting between said heads. Rigidly secured to the head 25 in any suitable manner, is a vertically extending motion transmitting device, preferably in the form of a vertical plunger rod 26 extending upward through the opening 12 in the head 11, and reciprocable therethrough. The upper end of the plunger rod is slotted longitudinally, as at 27, said slot being formed at its base with a stop face 28 and at its upper end being closed by a block 29 held in place by means of a rivet 30 extending through the plunger and said block.

Figure 3:
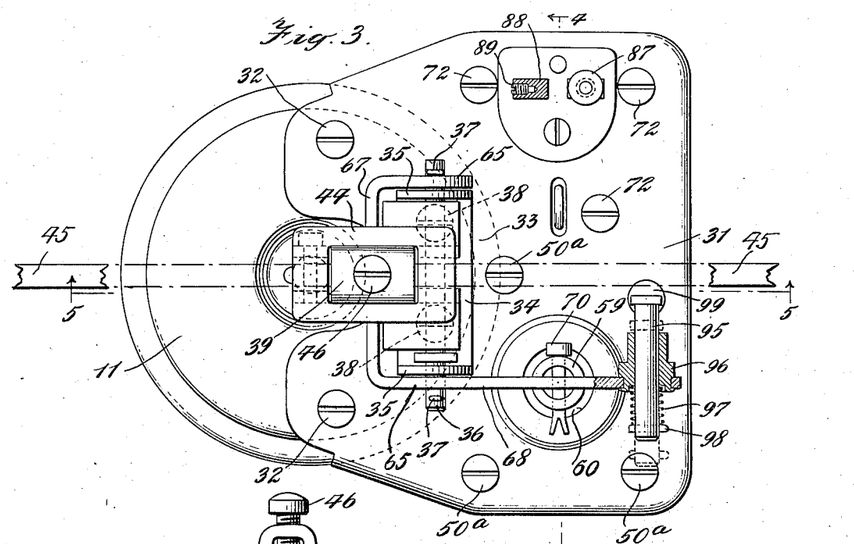
Fig. 3 is a top plan view, partly in section, of the regulating means shown in Fig. 2.

On the upper face of the head 11 is arranged a supporting member or bracket, preferably in the form of a horizontal plate 31 and secured rigidly to said head preferably by means of screws 32, and on this plate is received rigidly a bracket member 33 comprising a horizontal member 34 provided at its ends with vertical ears or lugs 35 provided with alining apertures in which is arranged a bearing pin or shaft 36 held in position by means of cotter-pins 37. The horizontal member 34 is secured to the plate 31 by means of screws 38 let through said member into said plate, as shown in dotted lines in Fig. 3. 39 designates, generally, a rocker member, preferably but not necessarily of the form shown by U. S. Letters Patent 1,751,193, granted March 18, 1930. This rocker member is shown as being of inverted V-shape in side elevation and substantially inverted U-shape in end view, so as to be provided at each end with pairs of legs 40, 41, respectively. The legs 40 are fulcrumed on the pin 36, and the legs 41 carry a transverse pin 42 which is located in the slot 27, whereby the rocker member 39 is adapted to swing on the pin 36 as a fulcrum, and a lost motion connection is provided between the rocker member and the plunger 26. The side members of the rocker member are provided with shoulders 43 which support an aperture plate 44 upon which rests an operating member in the form of a lever bar 45 adjustably held in position against said plate by means of a clamping screw 46 threaded through said rocker member and engaging with its inner end against said lever. It will be seen that the lever 45 may be adjusted longitudinally with relation to the rocker member and clamped thereto by the screw 46. On the lever bar at one side of the fulcrum for the rocker member, is a weight 47 which tends to urge the lever downward so that the pin 42 rests on the stop-face 28 at the base of the slot 27, whereby the weight opposes expansion of the bellows 24 and upward movement of plunger 26 and permits the same to expand to lift the lever 45 only when the pressure in the bellows 24 is sufficient to overcome the resistance of the weight. The weight is adjustable lengthwise of the lever to regulate the resistance and consequently the amount of pressure necessary to collapse the bellows to raise the lever. The opposite end of the bellows from that supporting the weight is pivotally connected, as at 48, to the upper end of the damper operating rod 7, so that a pressure in the bellows 24 sufficient to raise the lever against the resistance of the weight will move the check damper toward open position and the draft damper toward closed position, and a drop of pressure will result in the check damper being closed and the draft damper opened.

The construction so far described provides for maintenance of desired combustion conditions in the boiler by means responsive to a rise or fall of steam pressure, which is an effect resulting from a corresponding rise or fall of temperature.

The means whereby the regulating means set forth, is rendered subject to and controlled by the temperature in a room or space supplied with heat by the heat emitting element 1, will now be described.

Mounted on the lower side of the plate 31 is a cup-shaped receptacle or housing member 49 having an annular lip 49a which abuts and is secured tightly to the plate, as at 50, the connection being made preferably by screws 50a passed through the plate 31 and having nuts 50b on the lower ends thereof clamped over the lip 49a. The receptacle is formed with an inwardly directed annular shoulder 51 upon which is seated a ring member 52, secured fluid-tight thereto by soldering. Secured to the inner edge of said ring member is the upper open end of an expansible-collapsible or diaphragm element, preferably in the form of a corrugated metallic bellows 53, the joint between the bellows shell and the ring being made fluid-tight by soldering, in a well known manner. The bellows is disposed concentrically of the receptacle 49, and is closed at its lower or inner end by means of a rigid head 54 sealed to the bellows by a well known form of solder joint, as shown at 55. The resilient bellows is of less diameter than the receptacle and is arranged coaxial therewith so that an annular space 56 is provided, and the bellows is normally of less length than the receptacle, so that a pressure space 57 exists between the base of the receptacle and the head 54.

Secured centrally to the head 54 and projecting upward within the member 53, is a tubular nipple member 58, and slidably sleeved on this member 58 is the lower end of a hollow thrust member in the form of a plunger bar 59 which extends vertically through the member 53 and upward through an opening 60 in the plate 31. On the plunger bar 59 is threaded for adjustment lengthwise thereof a sleeve 61 having a flange 62 constituting an abutment against which abuts one end of a spiral spring 63, the opposite end of which abuts the under side of plate 31, the spring being seated in and centered by a recess 64 in said plate. This spring 63 resists upward or collapsing movement of the element 53 and also exerts its force to extend said bellows for a purpose to be presently described. The sleeve 61 is adjustable to regulate the force or resistance of the spring 63. The nipple 58 has threaded into the upper end of its bore a metal filling tube 64'.

On the pin 36 and outside the ears 35, is fulcrumed the ends of the legs 65 of a U-shaped lever 66, the cross-bar 67 of which is located beneath the rocker member 39 and is adapted to engage the under portion thereof, as shown in Fig. 5, preferably in the crotch between the legs 40, 41. The end of one of the legs 65 is provided with an extension 68 located in a slot 69 in the upper end of plunger 59 and pivotally connected to said plunger by a cross-pin 70 fixed in the plunger. By the construction described, it will be seen that when the bellows 53 is collapsed or moved upwardly, it will raise the plunger 59 to lift the extension 68 and thereby lower the U-shaped lever to move the cross-bar 67 downward and away from the rocker member 39, so that the latter may be moved freely by the bellows 24 and the weight 47.

When the bellows 53 is extended or moved downwardly by the spring 63, the extension 68 will be lowered to thereby raise the cross-bar 67 into engagement with the rocker member against the force of the weight 47, the rocker member being permitted by virtue of the lost motion connection provided between pin 42 and plunger 26, to move relative to the bellows 24, irrespective of the position thereof due to the pressure therein.

Figure 6:
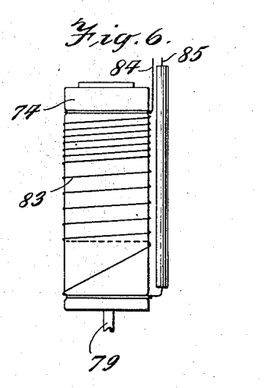
Fig. 6 is a detail view of an electrically heated thermostatic element forming part of the regulating means.

The thermostatic means for actuating the bellows 53 will now be described: On the bottom of the plate 31 is a cup-shaped casing 71 secured to said plate by screws 72 let through the plate and having nuts 72a on their lower ends to engage the lip 73 on the cup and clamp it against the plate 31 in the same manner as the receptacle 49. In the casing 71 is housed a sealed cylindrical vessel or bulb 74, comprising an open-ended tubular side wall closed fluid-tight at its ends by upper and lower heads or plug members 75, 76, said wall being of suitable heat transmitting metal such as copper. The plug members 75, 76 seat on internal annular shoulders formed in the tubular side wall and are sealed thereagainst as, for example, by turning over the ends of the wall upon the plug members. The vessel 74 is secured in place by a screw 77 extending through a block of insulation 78 located on top of plate 31 and through said plate into the head 75 (see Fig. 4). This vessel 74 is charged with a suitable volatile liquid such as acetone, ethyl alcohol, etc., which upon being heated to the necessary degree will generate a vapor pressure in the vessel. The vessel 74 is connected communicatively to the cup 49 by means of a copper tube 79, said tube having one end opening through the head 76 into the vessel 74, as shown at 80, and the other end being connected communitatively, as at 81, to the receptacle 49. The intermediate portion of the tube is looped upward inside the casing 71 over the edge of said casing and then down to the point of connection 81, all as shown in Fig. 4. The casing 71 is provided with a port 81a through its bottom wall, preferably directly below the tube 79, and is also provided with ports 81b through its side wall above the port 81a so that a cooling medium such as air can circulate through the casing to cool the tube 79. The vessel 74 is covered by a sheath of suitable electrical insulation 82, and wrapped over the same is a coil or spiral of resistance wire 83, the upper end of which is connected to a circuit lead wire 84 and the lower end to a lead 85, which is covered by an insulating tube 86 of glass, or other suitable material. The lead 84 passes into a binding post or terminal 87, and the lead 85 passes into a binding post 88, in which posts said leads are clamped by the screws 89. The lead 84 is connected by the binding post 87 to one end of a wire 84a which is in circuit with one end of a secondary 90 of a transformer 91, the primary 92 of which is supplied with current from any suitable source, the other end of the secondary 90 being connected by a lead 93 to a contact (not shown) in a thermostatic switch 94 located in a room to be heated. The lead 85 is connected through the binding post 88 by a wire 85a to the other contact of the thermostat 94. The thermostatic switch 94 may be of any suitable type embodying contacts which close and open the circuit upon a predetermined change of temperature, in the present instance the thermostat acting to open the circuit at a maximum temperature adjustment and close the circuit at a minimum temperature adjustment.

The bulb or vessel 74, the tube and the receptacle 49 constitute a fluid-pressure thermostatic system which is charged with the volatile, for example, acetone, in such quantity that the system is compeltely or substantially completely filled when the bulb is cold and the bellows 53 is extended downward by the spring 63. It will be understood that the volatile in the vessel 49 is in the annular space 56 between the vessel wall and bellows 53 and beneath the bellows.

The construction and arrangement being as above described, the operation is as follows: It will be understood that pressure in the steam space of the boiler is communicated through the connection 18 to the interior of the bellows 24, and the weight 47 is adjusted on the lever 45 to resist the pressure in the bellows, so that the bellows will be expanded upon existence of a certain pressure therein sufficient to overcome the resistance of the weight, and will be collapsed when the pressure therein is exceeded by the weight. When the pressure in the steam space reaches a certain degree, the plunger 26 moves upward to overcome the weight, and moves the lever 45 to adjust the check and draft dampers to regulate or cut down the rate of combustion in the furnace, and upon a drop in pressure the weight eventually moves the lever down and collapses the bellows, thereby causing the lever 45 to adjust the dampers to increase the rate of combustion and therefore increase the heat output of the furnace or boiler.

So long as the temperature in the space supplied with heat is below a desired maximum for which the thermostat 94 is set, the contacts at the thermostat will close and remain closed, furnishing current to the heater coil 83 which surrounds the thermostatic bulb or vessel 74, and the heat supplied by the coil volatilizes the liquid in the system, thereby generating pressure in the bulb, which exerted on the remaining or unvolatilized liquid therein, acts through the body of liquid to generate sufficient pressure in the vessel 49 to collapse the bellows 53, that is, move it upward. The collapsing or upward movement of the bellows 53 forces the plunger 59 upward, thereby moving the lever extension 68 in the same direction and moving the cross-bar 67 downward, carrying its upper edge out of contact with the bottom of the rocker member 39 and permitting the lever 45 to be operated freely under the control of the pressure existing in the bellows 24. With the parts in the position as so far described, the regulating means acts in accordance with the heat conditions resulting from combustion in the boiler, the lever 45 rising and falling in accordance with variations in the pressure caused by changes in the rate of combustion. Under these conditions the spring 63 is compressed by the pressure exerted by the volatile fluid surrounding and beneath the bellows 53, and these conditions of operation will continue so long as the heating coil circuit is closed at the thermostat 94. So long as the heating coil circuit is closed, the cross-piece 67 will be held down, its downward movement being arrested by contact of the lower edge of the cross-piece with the top plate 31, that is, the cross-piece will be moved down until it is arrested by a positive stop against the plate 31. The parts are so proportioned and related, and such quantity of the volatile liquid is used, that when the bulb 74 is heated, the lever cross-piece 67 will be moved down until it is stopped positively by engagement with the top plate 31, that is, the lever moves its full distance downward until it is stopped positively, in which position it is held so long as the bulb is heated.

When the temperature in the space supplied with heat reaches a maximum for which the thermostat 94 is set, said thermostat will operate its contacts to break the heater coil circuit, which will result in cooling of the bulb or vessel 74 so that the volatile condenses therein, and the pressure previously created by the volatilization will no longer exist. When the bulb has cooled so as to result in sufficient condensation to reduce the fluid pressure to a point where it can no longer overcome the force of the compressed spring 63, said spring will expand, forcing the liquid out of the vessel 49 and back through the tube 79 into the bulb. The expanding action of spring 63 expands the bellows 53, and pushes down on the plunger 59 and lever extension 68 to raise the cross-piece 67 until the upper edge thereof strikes the bottom of the rocker member 39, thereby swinging the same clockwise (see Figs. 2 and 5) and rocking lever 45 against the action of weight 47 to lower the opposite end of said lever and the rod 7 to close the draft damper and open the check damper and thereby reduce the rate of combustion in the heating apparatus. This condition will continue so long as the contacts at the thermostat 94 are maintained in open position to break the circuit to the heater coil.

It will be seen that a regulating means is provided in which combustion in the boiler is controlled in accordance with an effect produced by the combustion conditions at the boiler, so long as the temperature of the room supplied with heat is below a given degree, but should the temperature in the space supplied with heat rise to a given maximum determined by the thermostat 94, the regulating means will be operated in accordance with the temperature in said space to reduce the rate of combustion and therefore the rate of supply of heat to the space, until the temperature again drops below the maximum set.

It will be noted that the lost motion connection provided by means of the slot 27 and pin 42, will permit the rocker member 39 to be raised by the cross bar 67 of lever 66, irrespective of the position of the plunger 26 when the spring 63 acts to swing the rocker member 39 counterclockwise, and it will also be seen that when the circuit to the heater coil is closed and the bulb heated, the weight will move the rocker member counterclockwise to cause the pin 42 to rest on the bottom of the slot 27, whereby the rocker member is in position for control by the bellows 24.

When firing a boiler or other heating apparatus, it is desirable to close the check damper while maintaining the draft damper closed in order to prevent emission of gases from the firepot through the fuel charging door, and means is provided whereby the thermostatic control, including the lever 67, can be placed in position to permit the weight 47 to descend, thereby closing the check damper without opening the draft damper. This means comprises a holding member or latch in the form of a sliding pin 95 arranged to slide in a guide sleeve 96 fixed in the end of lever extension 68 and held normally in a retracted position by means of a spring 97 arranged between said lever and a stop 98 on said pin. When it is desired to supply fuel to the furnace at any time while the thermostat 94 is acting to break the heating coil circuit to thereby permit spring 63 to raise the lever 45 to hold the check damper open to check the fire, the operator can pull down on the weighted end of lever 45 against the spring force, and then push the pin 95 inward to the position shown in full lines in Fig. 3, in which position the pin will rest on the stop 99 and thereby hold the check damper closed. After firing, the operator can pull down on the weighted end of the lever 45 which will release the pin 95, which will be retracted automatically by the spring 97 to the position shown in dotted lines in Fig. 3, whereupon the heating apparatus will be restored to automatic control by the bellows 24, and the thermostatic system including the bulb 74 and bellows 53.

What I claim and desire to secure by Letters Patent of the United States is:—

1. An apparatus of the character described, comprising a lever, means adapted to repond to a condition within a heating apparatus to thereby move said lever in one direction, means movable toward and away from said lever and operable when moved toward said lever to engage and move it in said one direction and when moved away from said lever to permit said lever to be operated by said first-named means, a spring to move said second-named means to move said lever, and thermostatically controlled means operable to overcome said spring and disengage said first-named means from said lever.

2. An apparatus of the character described, comprising a lever, means adapted to respond to a condition within a heating apparatus to move said lever in one direction, a second lever movable toward and away from said first lever and operable to engage said first lever to move it in said one direction, a spring normally tending to cause said second lever to move said first lever in said one direction, and thermostatically controlled means operable to overcome said spring and move said second lever away from said first lever.

3. An apparatus of the character described, comprising a lever, means adapted to respond to a condition within a heating apparatus to move said lever in one direction, a lost motion connection between said means and lever, a second lever movable toward and away from said first lever to move it in said one direction, a spring normally tending to cause said second lever to move said first lever in said one direction, and thermostatically controlled means operable to overcome said spring and move said second lever away from said first lever.

4. An apparatus of the character described, comprising a lever, means adapted to respond to a condition within a heating apparatus to thereby move said lever in one direction, a second lever movable toward said first-named lever to engage said first-named lever to move it in said one direction, and movable away from said first-named lever to leave it free to be operated by said means, a plunger rod connected to said second-named lever, a spring acting on said plunger rod to cause the second-named lever to engage and move the first-named lever, and thermostatically controlled means operable on said plunger rod to move said second-named lever away from said first-named lever.

5. An apparatus of the character described, comprising a lever, means adapted to respond to a condition within a heating apparatus to thereby move said lever in one direction, a second lever movable toward said first-named lever to engage said first-named lever to move it in said one direction, and movable away from said first-named lever to leave it free to be operated by said means, a plunger rod connected to said second-named lever, a spring acting on said plunger rod to cause the second-named lever to engage and move the first-named lever, and an expansible-collapsible element operable on said plunger, a bulb communicatively connected to said element, said element and bulb containing a volatile liquid which when volatilized creates pressure acting on said element to move said second-named lever away from said first-named lever.

6. An apparatus of the character described, comprising a lever, means adapted to respond to a condition within a heating apparatus to thereby move said lever in one direction, a second lever movable toward said first-named lever to engage said first-named lever to move it in said one direction, and movable away from said first-named lever to leave it free to be operated by said means, a plunger rod connected to said second-named lever, a spring acting on said plunger rod to cause the second-named lever to engage and move the first-named lever, an expansible-collapsible element operable on said plunger, a bulb communicatively connected to said element, said element and bulb containing a volatile liquid which when volatilized creates pressure acting on said element to move said second-named lever away from said first-named lever, electric heating means for said bulb, and a thermostatic switch controlling current to said electric heating means.

7. An apparatus of the character described, comprising a lever, means adapted to respond to a condition within a heating apparatus to thereby move said lever in one direction, a supporting plate connected to said means, a second lever fulcrumed on said plate and movable toward said first-named lever to engage said first-named lever to move it in one direction, a chamber supported by said plate, a diaphragm element sealed to said chamber to form a fluid tight chamber, a plunger operable by said element and connected operatively to said second-named lever, a bulb supported by said plate and communicatively connected to said chamber, said bulb and chamber containing a volatile liquid which when volatilized creates pressure acting on said element to move said second-named lever away from said first-named lever, and a spring opposing operation of said element and tending to move said second-named lever into engagement with said first-named lever.

8. An apparatus of the character described, comprising a lever, means adapted to respond to a condition within a heating apparatus to thereby move said lever in one direction, means movable toward and away from said lever and operable when moved toward said lever to engage and move it in said one direction and when moved away from said lever to permit said lever to be operated by said first-named means, a spring to move said second-named means to move said lever, thermostatically controlled means operable to overcome said spring and disengage said first-named means from said lever, and a manually operable latch means for holding said second-named lever in a predetermined position.

9. An apparatus of the character described, comprising a lever, means adapted to respond to a condition within a heating apparatus to thereby move said lever in one direction, means movable toward and away from said lever and operable when moved toward said lever to engage and move it in said one direction and when moved away from said lever to permit said lever to be operated by said first-named means, a spring to move said second-named means to move said lever, thermostatically controlled means operable to overcome said spring and disengage said first-named means from said lever, a fixed stop, and a manually operable latch means cooperable with said stop for holding said second-named lever in a predetermined position.

10. An apparatus of the character described, comprising a lever, means adapted to respond to a condition within a heating apparatus to thereby move said lever in one direction, means movable toward and away from said lever and operable when moved toward said lever to engage and move it in said one direction and when moved away from said lever to permit said lever to be operated by said first-named means, a spring to move said second-named means to move said lever, thermostatically controlled means operable to overcome said spring and disengage said first-named means from said lever, said second-named lever having an extension, and a manually operable latch means on said extension for holding said second-named lever in a predetermined position against the force of said spring.

11. An apparatus of the character described, comprising a support, a rocker member on said support, a lever carried by said rocker member, means adapted to respond to a condition within a heating apparatus and connected to said rocker member to rock the same, an intermediately fulcrumed lever on said support and one end thereof being movable toward and away from said rocker member and operable when moved toward said member to swing it in one direction and when moved away from said member to permit it to be moved by said first-named means, a diaphragm element on said support and comprising a wall of an expansion chamber, a plunger operatively connecting said element to the end of said second lever opposite to the end which cooperates with the rocker member, a bulb communicatively connected to said chamber, said bulb and said chamber containing a volatile liquid which when volatilized creates pressure acting in said chamber to cause said element to operate the plunger to move said second lever away from said rocker member, and spring means opposing operation of said element and operable to move said second lever away from said rocker member.

12. An apparatus of the character described, comprising a support, a rocker member on said support, a lever carried by said rocker member, means adapted to respond to a condition within a heating apparatus and connected to said rocker member to rock the same, an intermediately fulcrumed lever on said support and one end thereof being movable toward said member to swing it in one direction and when moved away from said member to permit it to be moved by said first-named means, a diaphragm element on said support and comprising a wall of an expansion chamber, a plunger operatively connecting said element to the end of said second lever opposite to the end which cooperates with the rocker member, a bulb communicatively connected to said chamber, said bulb and said chamber containing a volatile liquid which when volatilized creates pressure acting in said chamber to cause said element to operate the plunger to move said second lever away from said rocker member, spring means opposing operation of said element and operable to move said second lever away from said rocker member, and latch means for holding said second lever in a predetermined position relative to said rocker member.

13. An apparatus of the character described, comprising a support, a rocker member on said support, a lever carried by said rocker member, means adapted to respond to a condition within a heating apparatus and connected to said rocker member to rock the same, an intermediately fulcrumed lever on said support and one end thereof being movable toward and away from said rocker member and operable when moved toward said member to swing it in one direction and when moved away from said member to permit it to be moved by said first-named means, a diaphragm element on said support and comprising a wall of an expansion chamber, a plunger operatively connecting said element to the end of said second lever opposite to the end which cooperates with the rocker member, a bulb communicatively connected to said chamber, said bulb and said chamber containing a volatile liquid which when volatilized creates pressure acting in said chamber to cause said element to operate the plunger to move said second lever away from said rocker member, spring means opposing operation of said element and operable to move said second lever away from said rocker member, latch means on said second lever, and a stop on said support with which stop said latch means is engageable to hold said second lever in a predetermined position relative to said rocker member.

14. An apparatus of the character described, comprising a support, a rocker member on said support, a lever carried by said rocker member, means adapted to respond to a condition within a heating apparatus and connected to said rocker member to rock the same, an intermediately fulcrumed lever on said support and one end thereof being movable toward and away from said rocker member and operable when moved toward said member to swing it in one direction and when moved away from said member to permit it to be moved by said first-named means, a diaphragm element on said support and comprising a wall of an expansion chamber a plunger operatively connecting said element to the end of said second lever opposite to the end which cooperates with the rocker member, a bulb communicatively connected to said chamber, said bulb and said chamber containing a volatile liquid which when volatilized creates pressure acting in said chamber to cause said element to operate the plunger to move said second lever away from said rocker member, spring means opposing operation of said element and operable to move said second lever away from said rocker member, latch means on said second lever, a stop on said support with which stop said latch means is engageable to hold said second lever in a predetermined position relative to said rocker member, and a spring for normally holding said latch means out of position to engage said stop.

15. An apparatus of the character described, comprising a support, a rocker member on said support, a lever carried by said rocker member, means adapted to respond to a condition within a heating apparatus and connected to said rocker member to rock the same, an intermediately fulcrumed lever on said support and one end thereof being movable toward and away from said rocker member and operable when moved toward said member to swing it in one direction and when moved away from said member to permit it to be moved by said first-named means, a diaphragm element on said support, and comprising a wall of an expansion chamber, a plunger operatively connecting said element to the end of said second lever opposite to the end which cooperates with the rocker member, a bulb communicatively connected to said chamber, said bulb and said chamber containing a volatile liquid which when volatilized creates pressure acting in said chamber to cause said element to operate the plunger to move said second lever away from said rocker member, spring means opposing operation of said element and operable to move said second lever away from said rocker member, latch means cooperable with said second lever to hold said second lever in predetermined position, and means for causing said latch means to automatically release said second lever when the latter is moved by said element.

16. In an apparatus of the character described, a supporting plate member, a housing member secured to the underside of said plate member, an expansible-collapsible element sealed to said housing member and defining therewith an expansible chamber, said supporting member having an aperture therethrough, a plunger engaging said element and projecting through said aperture, a bulb element communicatively connected to said chamber and rigidly secured to the underside of said supporting member, said bulb element and said chamber containing a volatile liquid, said communication comprising an upwardly looped capillary tube positioned between said expansible-collapsible element and said bulb element, and means to heat said bulb element to volatilize said liquid to create pressure in said chamber to actuate said plunger.

17. In an apparatus of the character described, a supporting plate member, a housing member secured to the underside of said plate member, an expansible-collapsible element sealed to said housing member and defining therewith an expansible chamber, said supporting member having an aperture therethrough, a plunger engaging said element and projecting through said aperture, a bulb communicatively connected to said chamber and secured to the underside of said supporting member, said bulb and said chamber containing a volatile liquid, a casing surrounding said bulb, and an electric heater element within said casing and operable when energized to volatilize said liquid to create pressure in said chamber to actuate said plunger.

18. In an apparatus of the character described, a supporting member, a housing member rigidly fixed to said supporting member and having an open side, an expansible collapsible element closing and sealing said open side and defining with said housing member an expansion chamber, a lever fulcrumed on said supporting member, a plunger for transmitting movement from said element to said lever, a bulb positioned laterally of and spaced from said housing member, a casing enclosing said bulb, an upwardly looped capillary tube communicatively connecting the lower end of said bulb to said chamber and extending over the top edge of said casing, said bulb and said chamber containing a volatile liquid, and means to heat the liquid in said bulb thereby to expand said chamber and move said lever.

19. In an apparatus of the character described, a supporting member, a bearing shaft carried by said supporting member, a housing member rigidly fixed to said supporting member and having an open side, an expansible collapsible element closing and sealing said open side and defining with said housing member an expansion chamber, a pair of cooperable levers fulcrumed on said shaft, one of said levers being movable relative to the other, a plunger for transmitting movement from said element to the other of said levers whereby to move said one lever, a bulb positioned laterally of and spaced from said housing member, a tube communicatively connecting the lower end of said bulb to said chamber, said bulb and said chamber containing a volatile liquid, and means to heat the liquid in said bulb thereby to expand said chamber and move said one lever.

20. A device of the character described, comprising a supporting member, motor means carried thereby, a rocker member pivotally mounted on said supporting member, a lever pivotally mounted on said supporting member and concentrically with said rocker member, a thrust member operatively connecting said motor means and said rocker member, said lever having a projection engaging said rocker member, and a spring holding said projection in engagement with said rocker member.

21. A device of the character described, comprising a supporting member, motor means carried thereby, a rocker member pivotally mounted on said supporting member, a lever pivotally mounted on said supporting member and concentrically with said rocker member, a thrust member operatively connecting said motor means and said rocker member, means resiliently holding said rocker member and said lever in engagement, and manually operable means movable into position to oppose movement of said lever by said motor means.

22. A device of the character described, comprising a supporting member, motor means carried thereby, a rocker member pivotally mounted on said supporting member, a lever pivotally mounted on said supporting member and concentrically with said rocker member, a thrust member operatively connecting said motor means and said rocker member, means resiliently holding said rocker member and said lever in engagement, manually operable latch means for holding said lever against movement in one direction by said motor means, and means operable automatically upon movement of said lever in the opposite direction to release said latch means.

23. An apparatus of the character described, comprising a control device, a horizontally extending supporting member mounted on said device and having a laterally projecting overhanging portion, said device having an operating element movable relative to said member, a lever member pivotally mounted on the top face of said supporting member and operatively engaging said operating element to actuate said element, a diaphragm element positioned at the side of said device and mounted on the underside of said overhanging portion, said element comprising a wall of an expansion chamber, a plunger operatively connecting said element to said lever member, a bulb communicatively connected to said chamber, said bulb and said chamber containing a volatile liquid, means to heat said bulb to volatilize the liquid therein to create pressure in said chamber to actuate said plunger, and means opposing operation of said plunger by said element.

24. A device of the character described, comprising a plate member, a chambered element having a movable operating wall and carried by said plate member, a housing member secured to the underside of said plate member and extending downward therefrom, a tubular bulb element positioned in said housing member and spaced from the walls thereof, a conduit member extending into said housing member and having one end opening into said bulb element and having its other end opening into said chambered element, an electric heating coil surrounding said bulb element and electrically insulated therefrom, and a volatile liquid in said bulb element operable upon expansion on energization of said coil to move said wall.

25. In a device of the character described, a chambered element having a movable operating wall, an open-ended tubular bulb member having internal shoulders adjacent its open ends, plug members closing and sealing the open ends of said bulb member and fixed against said shoulders, a conduit establishing communication between the interior of said element and the interior of said bulb member, an electric heating element surrounding said bulb member and electrically insulated therefrom, and a volatile liquid in said bulb member operable upon expansion to move said wall when said heating element is energized.

26. In a device of the character described, a supporting member, means responsive to fluid pressure secured to said supporting member, a member operable by said responsive means, a conduit member for transmitting fluid pressure to said responsive means, an open-ended tubular bulb member having internal shoulders adjacent its open ends, plug members closing and sealing the open ends of said bulb member and fixed against said shoulders, one of said plug members having an opening therethrough, said conduit member opening into said bulb member through and being sealed in said plug member opening, an electric heating element surrounding said bulb member and electrically insulated therefrom, and a volatile liquid in said bulb member operable upon expansion to move said wall when said heating element is energized.

LEWIS W. EGGLESTON.